Fig.1.

April 20, 1926.  
W. S. H. HAMILTON  
1,582,007  
POWER LIMITING AND INDICATING SYSTEM  
Filed April 24, 1924  4 Sheets-Sheet 3

Fig. 3.

Inventor:  
William S. H. Hamilton,  
by  
His Attorney

April 20, 1926.

W. S. H. HAMILTON 1,582,007

POWER LIMITING AND INDICATING SYSTEM

Filed April 24, 1924      4 Sheets-Sheet 4

Fig.4.

Inventor:
William S.H.Hamilton,
by *Alexander S. Lunt*
His Attorney

Patented Apr. 20, 1926.

1,582,007

UNITED STATES PATENT OFFICE.

WILLIAM S. H. HAMILTON, OF SCHENECTADY, NEW YORK, ASSIGNOR TO GENERAL ELECTRIC COMPANY, A CORPORATION OF NEW YORK.

POWER LIMITING AND INDICATING SYSTEM.

Application filed April 24, 1924. Serial No. 708,809.

*To all whom it may concern:*

Be it known that I, WILLIAM S. H. HAMILTON, a citizen of the United States, residing at Schenectady, in the county of Schenectady, State of New York, have invented certain new and useful Improvements in Power Limiting and Indicating Systems, of which the following is a specification.

My invention relates to systems for indicating and limiting the amount of power interchanged between power sources or transmission systems and power distribution systems, and has for its object the provision of an improved power indicating and limiting system which is of rugged construction and is reliable in its operation.

The economic operation of a power generating and transmitting system requires that great and sudden changes in load be avoided or, in other words, that a high system load factor be maintained. If this is not done, the power company is required to provide equipment which is utilized during only a small part of the day to carry the peak loads of the system. The load factor of a transmission system is dependent to a considerable extent upon the load factors at which power is supplied to the different power consumers. This is especially true where power is utilized in large amounts, as in the case of railway systems. For this reason it is customary to base the rate of the power charge upon the load factor at which power is delivered.

Various power limiting systems for controlling the load factor at which power is delivered to a consumer have been proposed. These systems frequently comprise pilot wires interconnecting the various sources of power or substations of the consumer for totalizing the power delivered to the consumer and have not been altogether satisfactory for the reason that their operation may be affected by change in the temperature of the pilot wires and by leakage over the insulators by which these wires are supported. In accordance with my invention, these difficulties are avoided by measuring the total power supplied to the consumer in terms of a change in the frequency of the pilot wire current and utilizing this change to indicate and limit the value of the power supplied.

My invention will be better understood on reference to the following description when considered in connection with the accompanying drawing and its scope will be pointed out in the appended claims.

Referring to the drawing, Figs. 1, 2 and 3 respectively show diagrammatically the arrangement of the electrical equipments at the different substations of a system in which my invention has been embodied.

Figure 1:
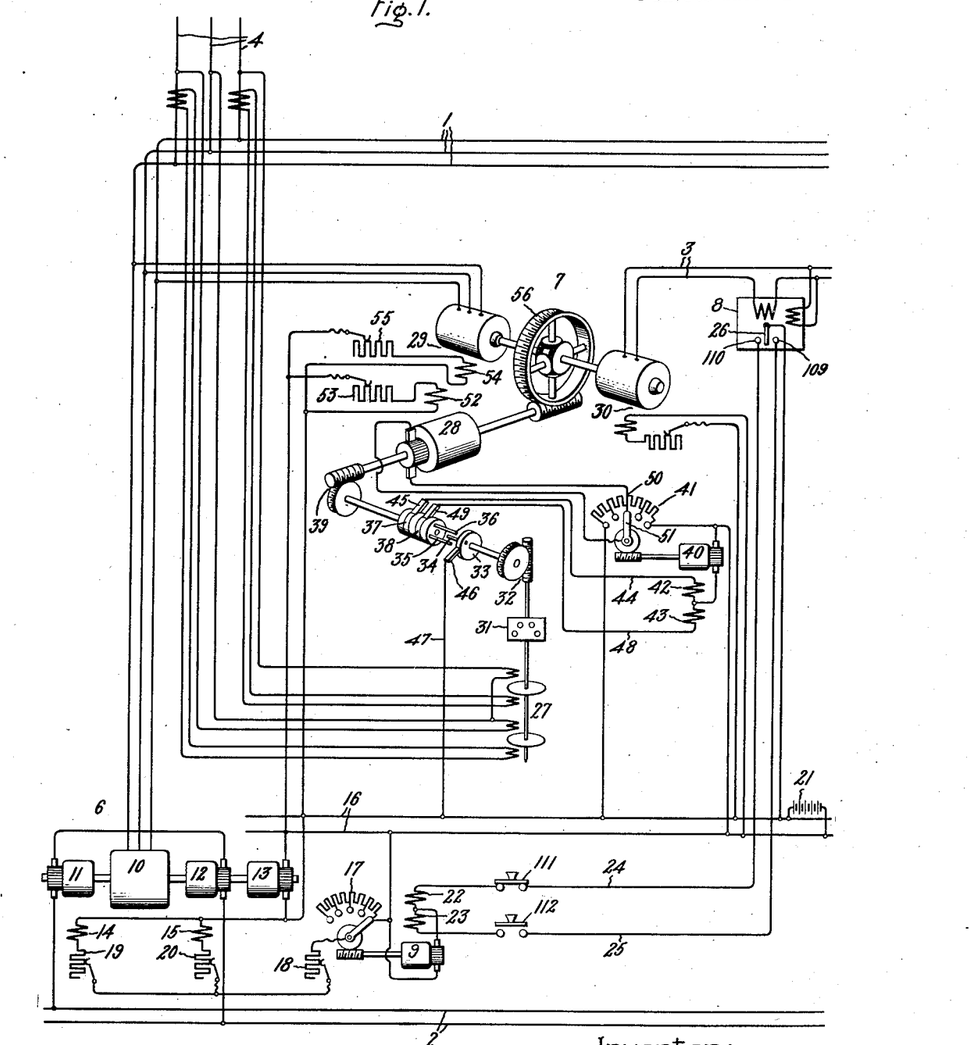

The figures show a polyphase circuit 1, a direct current distribution circuit 2, and a pilot wire circuit 3. Figs. 1 and 3 show polyphase lines 4 and 5 respectively through which the line 1 may be supplied with power from a transmission system. The lines 4 and 5 may be considered as sources from which power is transmitted to the direct current line 2 as regards the power transmitted between the lines 4 and 5 and the line 2; each of the substations may also be regarded as a source of power.

For simplicity of description, it has been assumed in Figs. 1, 2, 3, and 4 that power would be delivered into one end of the system of substations and at intermediate substations and that the load dispatcher's office, where it is desired to indicate and limit the power, would be located at the other end of the system. Such an arrangement, however, is not necessary for the proper working of this system and by suitable arrangement of the parts any desired relative arrangement of substations or load dispatcher's office may be used.

It has also been assumed that the only points at which power would be measured were at substations where power was supplied from the power company's lines such as 4 and 5 in Figs. 1 and 3. This system is, however, equally applicable to cases where it is desirable to measure the power input to each substation.

Fig. 1 shows the arrangement of the equipment at an end station of the system. This equipment comprises a motor generator set 6 for interchanging power between the lines 1 and 2, a machine aggregrate 7 for modifying the frequency of the pilot wire current in accordance with the power transmitted through the line 4, and an alternating current wattmeter type reverse power relay 8 for controlling the operation of a pilot motor 9 through which the voltage of the direct current generators of the motor-generator set 6 is regulated in a manner hereinafter explained.

The motor-generator set 6 comprises an alternating current motor 10, direct current generators 11 and 12 arranged to be driven by the motor 10 for supplying current to the line 2 and an exciter 13 for supplying current to the field windings 14 and 15 of the direct current generators 11 and 12 respectively through the direct current bus 16, the field rheostat 17 which is operated by the pilot motor 9, and the manually controlled rheostat 18. Manually controlled rheostats 19 and 20 are provided to facilitate independent adjustments in the value of the currents supplied to the field windings 14 and 15. A battery 21 may be associated with the direct current bus 16 to supply current thereto when the exciter 13 is not operating. The oppositely wound field coils 22 and 23 of the pilot motor 9 are arranged to be connected to the bus 16 through either of the leads 24 or 25, and the member 26 of the reverse power relay 8.

The aggregate 7 comprises a watthour meter 27 for measuring the amount of power transmitted through the feeder 4, a direct current motor 28 which is driven at a speed proportional to the power transmitted through the feeder 4, an alternating current motor 29 driven at an approximately constant speed from any suitable source of current, and an alternating current generator 30 which is adapted to supply current to the pilot circuit 3 at a frequency dependent upon the speed of the motor 28. The watthour meter 27 is provided with a register 31 for indicating the amount of power transmitted through the feeder 4 and with a worm and pinion 32 for driving the disk 33 at a speed dependent upon the instantaneous value of the power so transmitted. The disk 33 is provided with a contact member 34 arranged to cooperate with contact members 35 and 36 which are conductively associated with the slip rings 37 and 38 respectively. A worm and gear 39 are arranged to couple the shaft of the motor 28 to the shaft upon which the slip rings 37 and 38 are mounted so that these rings and the contact members 35 and 36 are driven at a speed dependent upon the speed of the motor 28.

The contact members 34, 35 and 36 are provided for controlling the speed of the motor 28 in accordance with the speed of the meter 27 and accomplish the result through a reversible motor 40 and a potentiometer 41. Both the motor 40 and the potentiometer 41 are operatively associated with the direct current bus 16. The motor 40 is provided with oppositely wound field windings 42 and 43. The winding 42 is arranged to be connected to the bus 16 through lead 44, brush 45, slip ring 37, contact members 35 and 34, disk 33, brush 46 and lead 47. The winding 43 is arranged to be connected to the bus 16 through lead 48, brush 49, slip ring 38, contact members 36 and 34, disk 33, brush 46 and lead 47. The armature winding of the motor 28 is connected between the center point 50 and the contact member 51 of the potentiometer 41. The field winding 52 of the motor 28 is arranged to be connected to the bus 16 through an adjustable field rheostat 53.

The manner in which the speed of the motor 28 is maintained at a value dependent upon that of the meter 27 will now be readily understood. When power is supplied through the line 4, the meter 27 starts to rotate in a clockwise direction, for example. This brings the member 34 into contact with the member 36, thereby connecting the field winding 43 of the motor 40 to the bus 16 as previously explained. When this occurs, the motor 40 starts to move the contact member 51 from its illustrated position and current is supplied to the armature winding of the motor 28 which thereupon begins to rotate in a direction to drive the members 35 and 36 in a clockwise direction. Contact between the members 34 and 36 is broken when the motor 28 has accelerated to a speed corresponding to or very slightly in excess of that of the meter 27 and the motor 40 is thus rendered inoperative to further increase the armature voltage and speed of the motor 28. If the speed of the motor 28 slightly exceeds that of meter 27, the member 34 is brought into contact with the member 35 and the motor 40 operates the potentiometer to slightly decrease the armature voltage and speed of the motor 28. Any slight variation from the desired relation between the speeds of the motor 28 and the meter 27 is thus immediately corrected and a practically constant speed relation is maintained.

As previously stated, the alternating current motor 29 is driven at an approximately constant speed in any convenient manner and the direct current motor 28 is driven at a speed dependent upon the amount of power transmitted through the line 4. It is apparent that a meter 27 may be connected in each of the lines interconnecting line 1 and the motors 10 instead of in the lines 4 and 5 if desired. In this case it would of course be necessary to provide a meter at each substation. When the line 4 is charged to normal voltage and no power is transmitted through it to line 1, the motor 29, which has its field winding 54 connected to the bus 16 through an adjustable rheostat 55, is operated at synchronous speed and the motor 28 is stationary. The rim 56 of the differential gear interconnecting the motors 28 and 29 and the generator 30 is therefore held against rotation and the generator 30 is driven at the same speed as the motor 29. Under these conditions, the generator 30 supplies current at a frequency proportional to that of line 1 to the pilot circuit 3. If power is now transmitted through the line 4, the motor 28 is accelerated and the differential rim 56 is rotated at a speed dependent upon the amount of this power. When this occurs, a difference between the speeds of the motor 29 and the generator 30 is produced and the frequency of the current delivered by the generator 30 is changed. This change in frequency is utilized to measure the power transmitted through the line 4. It is of course feasible to raise or lower the frequency of the pilot wire current at each substation by an amount which is determined by the amount of power transmitted through the substation between the transmission and distribution systems. To facilitate an explanation of my invention, it will be assumed that the frequency of the pilot circuit current is reduced at each substation interconnected with the transmission system by an amount dependent upon the amount of power supplied to the distribution system through the connection to the transmission system at that point. The frequency of the current supplied to the pilot circuit 3 by the generator 30 will then be reduced by an amount dependent upon the amount of power delivered through the feeder 4 which is connected to the distribution system at the substation illustrated by Fig. 1.

Figure 2:
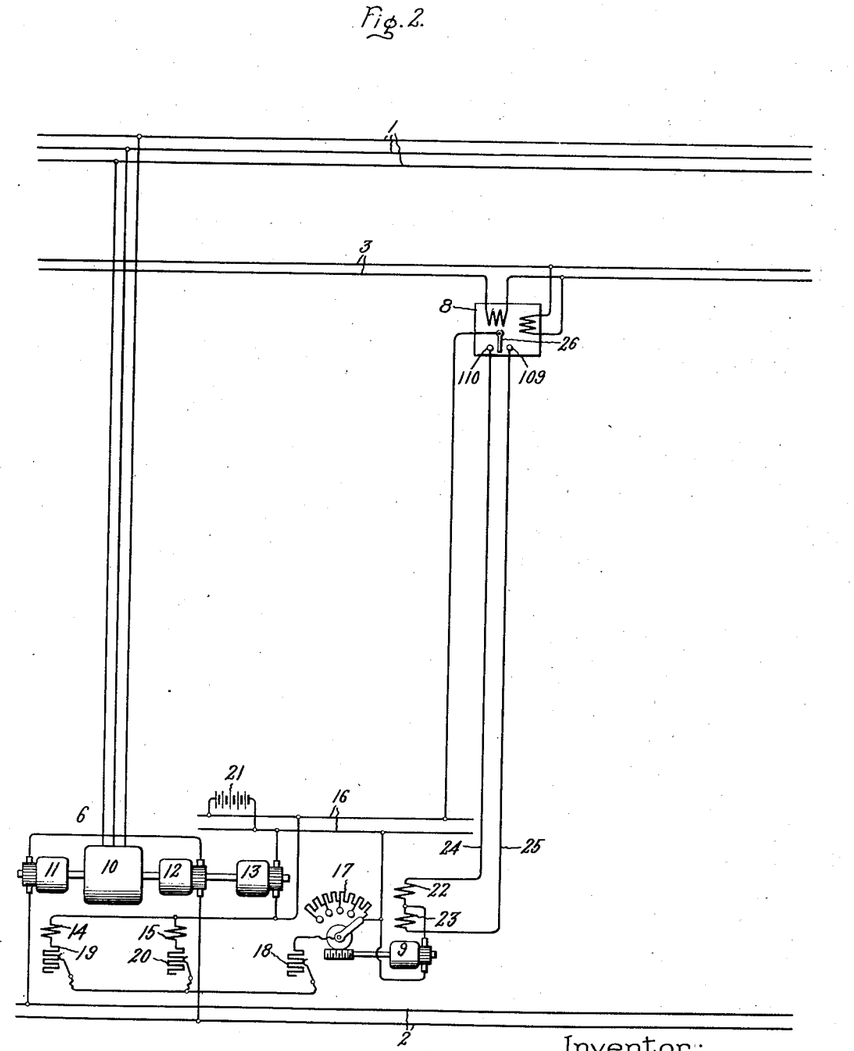
Figure 3:
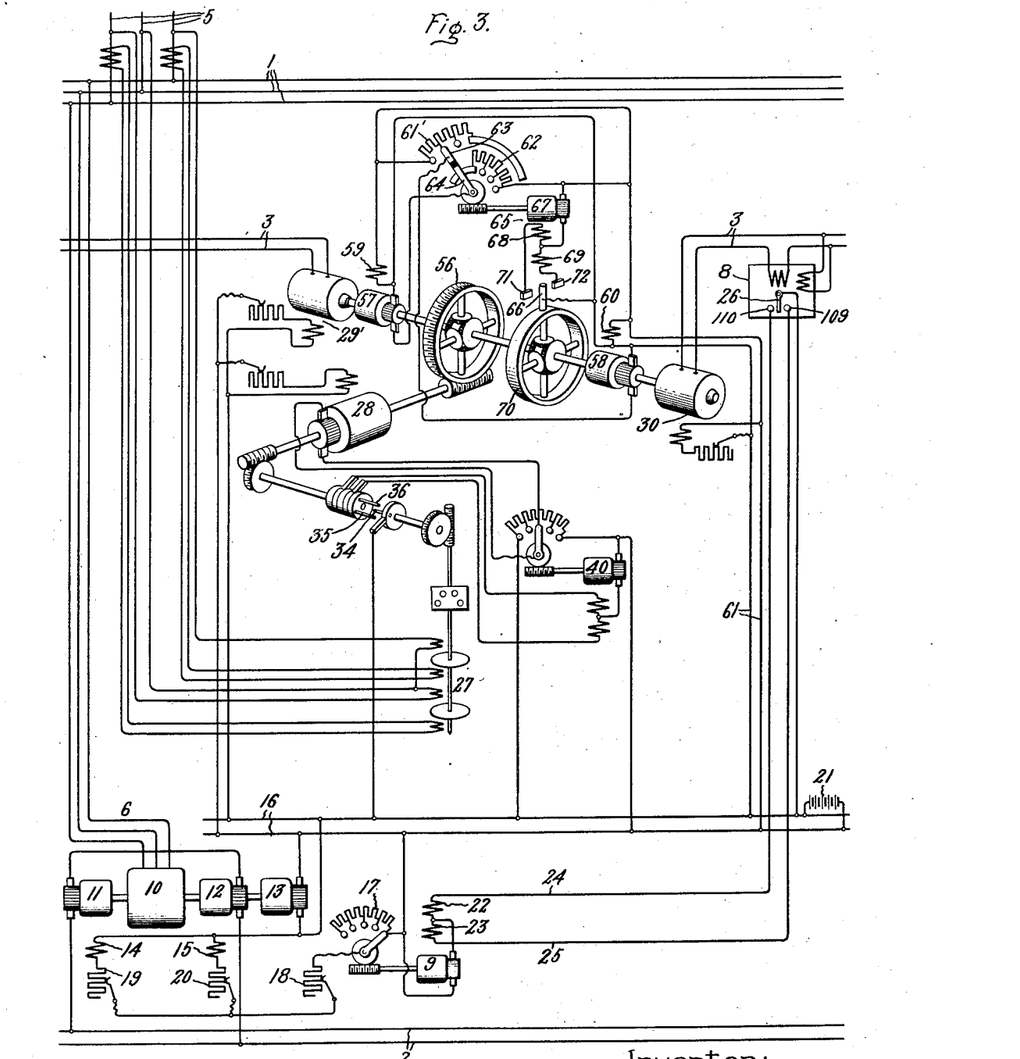

Fig. 2 illustrates the equipment at an intermediate substation which is not provided with a line interconnecting the transmission and distribution systems. The motor-generator and reverse power relay equipment of this substation is similar to that of the substation illustrated by Fig. 1. It will be observed that by connecting the meters 27 to the lines 4 and 5 instead of to the leads to the motors 10, the equipment at this intermediate station is greatly simplified.

Fig. 3 illustrates the arrangement of the equipment at an intermediate substation which is provided with a line 5 for interconnecting the transmission and distribution systems. The equipment of this substation is in most respects similar to that illustrated by Fig. 1, but differs therefrom in that direct current motors 57 and 58 are provided for supplying a part of the power required to drive the machines 29' and 30 under different conditions of operation, thus avoiding the necessity of supplying from one end of the pilot circuit all the power required for this purpose. Where the distance between the end substation and the load dispatcher's office is short, motors 57 and 58, differential 70, motor 65 and rheostats 61' and 62 may be omitted.

The field windings 59 and 60 of the motors 57 and 58 respectively are arranged to be supplied with current from the bus 16 through leads 61. The armature windings of the machines 57 and 58 respectively are adapted to be connected through rheostats 61' and 62 to the leads 61. A contact arm having insulated conductive segments 63 and 64 is operated by a pilot motor 65 to vary the resistance in the armature circuits of the machines 57 and 58. A contact member 66 is provided for connecting the armature winding 67 of the motor 65 and either of its oppositely wound field windings 68 or 69 in series between the leads 61. The contact member 66 is mounted on the differential gear rim 70 and is adapted to be moved to and fro between the contacts 71 and 72.

It will be observed that the rheostats 61' and 62 are related to each other in a manner to prevent simultaneous reduction of the resistance connected in series with the armature circuits of the machines 57 and 58. This arrangement is required to permit current to be transmitted through the pilot circuit 3 in either direction. If current is transmitted through the circuit 3 in a right hand direction, the member 66 will be moved into engagement with the contact 72, for example, and will be maintained in this position until the pilot motor 65 has moved the rheostat arm 63 into a position at which the motor 58 exerts sufficient torque to drive generator 30. Should the motor 58 exert so much torque that it tends to drive generator 30 at a greater speed than that of motor 29', then member 66 will break contact with contact 72 and make contact with contact 71. This will cause motor 65 to move arm 63 in such a direction as to increase the resistance 61', and thereby decrease the torque of motor 58.

With the rheostat arm 63 moved into such a position as to short circuit all of the resistance 61', motor 58 will not supply quite enough torque to drive generator 30. The remaining torque will be supplied by motor 29' and this will cause member 66 to remain in contact with contact 72 continuously. Under these conditions, the resistance 62 connected by the rheostat arm 64 in series with the armature winding of the motor 57 is comparatively high and this machine is enabled to exert only sufficient torque to overcome its no load losses. The speed of the generator 30 is therefore determined by the relation existing between the speeds of the motors 28 and 29', as set forth in connection with Fig. 1. If the line 5 is charged, but transmits no power to the line 1, the two differential rims 56 and 70 are stationary and the generator 30 is driven at the same speed as the motor 29'. If power is transmitted through the line 5, the differential rim 56 is rotated by the motor 28, and there is produced a difference between the speeds of the machines 29' and 30 which is proportional in value to the amount of power transmitted through the line 5.

If current is transmitted through the circuit 3 in a left-hand direction, the machine 30 is driven as a motor, the member 66 is moved into engagement with the contact 71 and the pilot motor 65 moves the rheostat arm into the position illustrated. Under these conditions, the motor 57 supplies almost, but not quite, enough torque to drive the machine 29' as a generator, the remaining torque being supplied by machine 30 which is now operating as a motor. The motor 58 is enabled to exert a torque only sufficient to supply its no load losses, and the machine 29' is driven as a generator at a speed dependent upon the relation existing between the speeds of the machines 28 and 30. It will be observed that the member 66 can only move between the contacts 71 and 72 and that the differential gear by which it is moved can therefore have no effect on the speed relations of the machines 28, 29' and 30. The reason for transmitting power through the pilot circuit in either direction is explained hereinafter in connection with a description of the operation of the entire distribution system.

Figure 4:
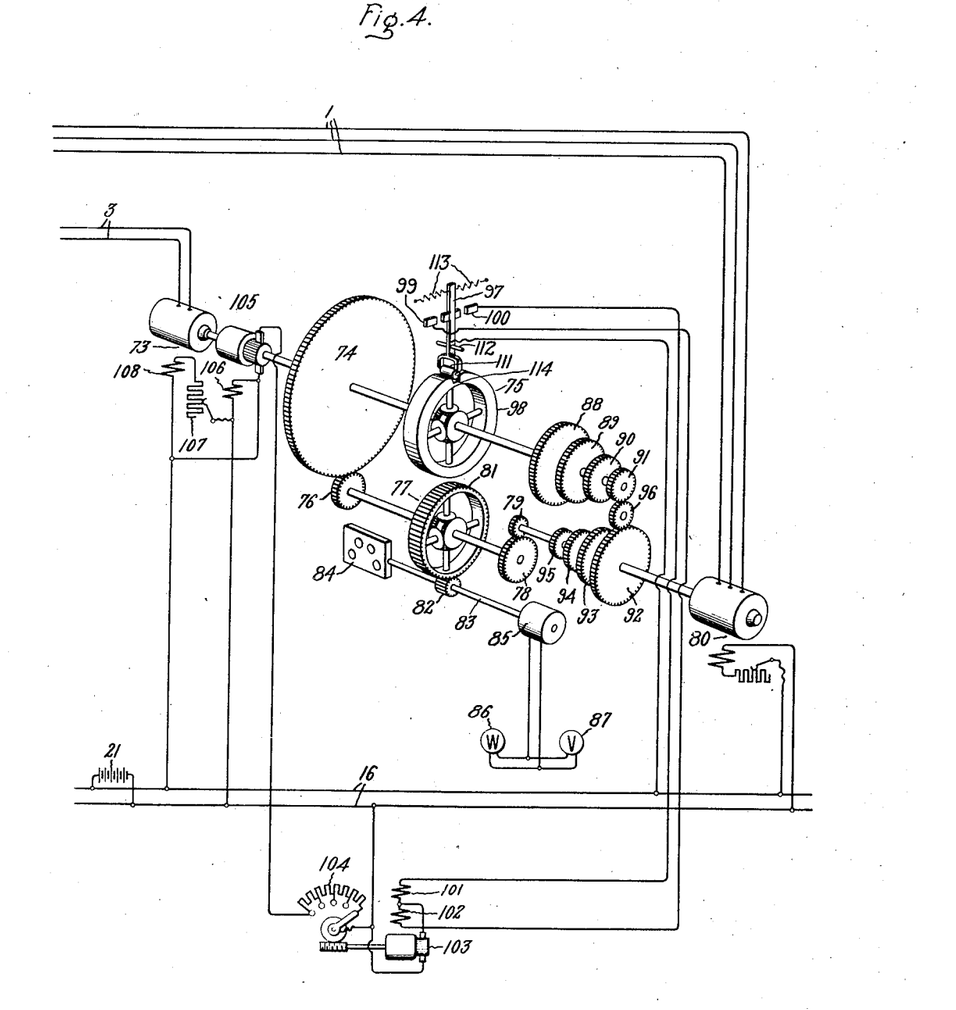
Fig. 4 shows diagrammatically the arrangement of the equipment in the load dispatcher's office.

Fig. 4 illustrates the arrangement of the equipment in the load dispatcher's office. This equipment comprises means for comparing the frequency of the pilot circuit current which has been transmitted through all the substations with the original frequency of this current, means for indicating the total distribution system load which is proportional to the total change in the frequency of the pilot circuit current, and means for preventing this load from exceeding a predetermined value. In the load dispatcher's office, the pilot circuit 3 is connected to a motor 73 which is coupled with a gear 74 and one member of a differential gear 75. A gear 76 coupled to one member of a differential gear 77 is arranged to mesh with the gear 74 which is driven at a speed proportional to the frequency of the pilot circuit current after it has been transmitted through all of the substations. Another member of the differential gear 77 is coupled to a gear 78 which meshes with a gear 79 on the shaft of a synchronous motor 80 driven at a speed dependent upon the frequency of the current supplied to the opposite end of the pilot circuit. With this arrangement, the rim gear 81 of the differential 77 is driven at a speed proportional to the total change in the frequency of the pilot circuit current. The rim gear 81 is adapted to mesh with a gear 82 mounted on a shaft 83 through which a kilowatt hour counter 84 is operated. Also mounted on the shaft 83 is a magneto or other suitable device 85 for operating a meter 86 to draw a curve indicating variations in the value of the system load and for operating a meter 87 to indicate the value of the system load at any instant.

As previously indicated, the gear 74 is coupled to one member of a differential gear 75. Another member of the differential gear 75 is coupled to gears 88, 89, 90 and 91 arranged to be operatively associated with the gears 92, 93, 94 and 95 through an intermediate gear 96. It will be observed that the gears 92 to 95 inclusive are mounted on the shaft of the synchronous motor 80 which is driven at a speed proportional to the frequency of the current supplied at the opposite end of the pilot circuit 3.

The rim 98 of the differential gear 75 has a slot 114 in it as illustrated. A contact arm 97 is pivoted at 112 and carries at one end a roller 111 adapted to engage with the slot 114. Springs 113 are arranged to hold contact arm 97 in between contacts 99 and 100. With this construction, it will be observed that with rim 98 rotating in a counter-clockwise direction, that contact arm 97 will be held in contact with contact 100 except for that time that roller 111 drops into slot 112, when the springs 113 will return it to the position shown. Should the direction of rotation of rim 98 reverse, contact arm 97 will be held in contact with contact 99 except for that time when roller 111 drops into slot 112. It is to be specially noted that with the above described arrangement of differential rim 98, there is no rigid connection between gear 74 and gear 88 and that relative movement of these gears will cause a rotation of rim 98 in one direction or the other which will cause contact member 97 to come in contact with either contact 99 or contact 100, but this condition will in nowise restrict directly the relative speeds of gears 74 and gears 88. This feature permits the power limiting portion of this equipment to function without interfering with the indicating portion. Contacts 99 and 100 connect through oppositely wound field coils 101 and 102 of a pilot motor 103 to the direct current bus 16. A rheostat 104 connected across the bus 16 in series with the armature circuit of a motor 105 is adapted to be operated by the pilot motor 103. The motor 105 is mounted on the same shaft as the motor 73 and is provided with a field winding 106 arranged to be supplied with current from the bus 16. An adjustable rheostat 107 is provided for regulating the value of the current supplied to the field winding 108 of the motor 73.

The gears 88 to 96 inclusive are provided for predetermining the maximum load of the distribution system. The gear 96 has four different positions and for each of these positions the system load will be limited to a different value. If the gear 96 is in the position shown and the system load is below the maximum value determined by the setting of the gear 96, contact arm 97 will be held in contact with contact 100, and the resistor 104 will be connected in the armature circuit of the motor 105, and this motor exerts only sufficient torque to overcome its no load losses. If the system load reaches its maximum value, however, the member 97 is moved into engagement with the contact 99, for example, and the motor 103 is operated to reduce the resistance 104 in the armature circuit of the motor 105, thereby increasing the torque of this motor until it drives the machine 73 as a generator. When this occurs, the direction of power transmission in the pilot circuit 3 is reversed and the reverse power relay 8 of the equipment illustrated by Fig. 3 moves the member 26 into engagement with the contact 110, for example, thereby energizing the field winding 22 of the motor 9 which operates to reduce the voltage and load of the main direct current generators 11 and 12 in this substation. This of course reduces the power transmitted through the motor-generator set 6 of this station.

Upon reversal in the direction of power transmission in the pilot circuit 3, the machine 30 in the equipment illustrated by Fig. 3 ceases to function as a motor and begins to operate as a generator, thereby driving the machine 29' as a generator in a manner explained in connection with the description of Fig. 4. The current delivered to the pilot circuit 3 by the generator 29' is transmitted through the reverse power relay 8 of the equipment illustrated by Fig. 2 and (as in the case of the equipment illustrated by Fig. 3, the member 26 is moved into engagement with the contact 110, thereby accelerating the pilot motor 9 by which the power transmitted through the motor-generator 6 of this substation is reduced.

Likewise, the movable member 26 of the reverse power relay 8 in the equipment illustrated by Fig. 1 is moved into engagement with the contact 110 at this substation and the pilot motor 9 moves the rheostat 17 to reduce the amount of power transmitted through the corresponding motor-generator set 6.

The power transmitted through the various substations to the direct current line 2 is thus decreased, and this decrease in load will continue until power ceases to flow in the pilot circuit. When this occurs the members 26 of the different reverse power relays 8 will assume a position as shown between contacts 109 and 110 and arrest further movement of rheostats 17. When the direction of power transmission in the pilot circuit reverses, the movable members 26 of the reverse power relays 8 in the different substations are moved into engagement with the contacts 109 and the voltage of the main direct current generators is increased to normal value in a manner which will be readily understood without further explanation. If desired, limit switches 111 and 112 may be arranged to open the circuits 24 and 25 respectively when the rheostat 17 has been operated to a position to include the entire resistor 17 in or exclude it from the field circuits of the main generators 11 and 12. Limiting switches may also be provided in connection with the field windings 101 and 102 of the motor 103, and also in connection with motors 40 and 65. To facilitate starting and stopping of the synchronous machines 29', 30 and 73, they may be provided with a starting winding which is disconnected by a centrifugal switch when the machine has been accelerated to a predetermined speed. Any other well known means may be utilized to enable these machines to produce the starting torque necessary for their proper operation.

A power limiting and indicating system arranged in accordance with my invention is both rugged in construction and reliable in operation. Since its operation depends solely upon the summation of frequency changes produced in the pilot circuit current by the interchange of power between the transmission and distribution system at various points, difficulties due to change in the temperature of the pilot circuit conductors and to leakage over the pilot circuit insulators are avoided. With the arrangement shown, power is readily transmitted over the pilot circuit in either direction and in either direction between the transmission and distribution systems.

I have explained my invention by illustrating and describing certain specific embodiments thereof, but it will be readily understood by those skilled in the art that it may be embodied in many other forms than those shown and described. I, accordingly, do not wish to be restricted to the particular forms of construction disclosed herein by way of example for the purpose of setting forth my invention in accordance with the patent statutes. The terms of the appended claims are, therefore, not restricted to the precise structure disclosed, but are intended to cover all changes and modifications within the spirit and scope of my invention.

What I claim as new and desire to secure by Letters Patent of the United States is:—

1. In a system for limiting the amount of power transmitted between an electric power system and a plurality of sources, the combination of a pilot circuit, an alternating current source for supplying power to said pilot circuit, means associated with said sources for changing the frequency at which power is supplied through said pilot circuit by an amount proportional to the magnitude of the power transmitted between said sources and said system, means responsive to a predetermined load on said system for reversing the flow of power in said pilot circuit, and means responsive to said reversal for limiting the load on said system.

2. In a system for limiting the amount of power transmitted between a plurality of sources and a distribution system, the combination of a pilot circuit, means for supplying alternating current to said pilot circuit, means associated with each of said sources for changing the frequency at which power is supplied from said alternating current means to said pilot circuit by an amount proportional to the magnitude of the power transmitted between said sources and said system, means responsive to a predetermined load on said system for reversing the flow of power in said pilot circuit, and means responsive to said reversal for limiting the load on said system.

3. The method of limiting the amount of power transmitted between a power system and a plurality of sources interconnected by a pilot circuit arranged to transmit alternating current power in either direction which consists in changing the frequency at which power is transmitted through said pilot circuit by an amount proportional to the magnitude of the power transmitted between said sources and said system, reversing the flow of power in said pilot circuit when the power transmitted between said system and said sources reaches a predetermined value, and limiting the power transmitted between said sources and said system in accordance with the magnitude of the power transmitted through said pilot circuit in the reverse direction.

4. The method of limiting the amount of power transmitted between an electric power system and a plurality of substations interconnected by a pilot circuit arranged to transmit alternating current power in either direction which consists in changing the frequency at which power is transmitted from each substation through said pilot circuit by an amount proportional to the magnitude of the power transmitted between said system and said substation, reversing the flow of power in said pilot circuit when the sum of the changes in the frequency at which power is transmitted through said pilot circuit exceeds a predetermined value, and limiting the power transmitted between said substations and said system in accordance with the magnitude of the power transmitted through said pilot circuit in the reverse direction.

5. In a system for limiting the amount of power transmitted between an electric power system and a plurality of sources, the combination of a pilot circuit, alternating current means for supplying power to said pilot circuit, means associated with said sources for changing the frequency at which power is supplied through said pilot circuit by an amount proportional to the magnitude of the power transmitted between said sources and said system, means responsive to a predetermined load on said system for reversing the flow of power in said pilot circuit, and means comprising a reverse power relay connected in said pilot circuit for limiting the load on said system.

6. A system for indicating the amount of power transmitted between a power system and a source, comprising an indicating device, a pilot circuit for interconnecting said source and said indicating device, and means for supplying alternating current to said pilot circuit at a frequency dependent upon the magnitude of the power transmitted between said source and said system, said means including an alternating current generator, a differential gear, means for driving said generator through said gear, and means operatively associated with said differential for varying the speed of said generator in accordance with the power transmitted between said system and said source.

7. A system for indicating the amount of power transmitted between a power system and a source, comprising an indicating device, a pilot circuit for interconnecting said source and said indicating device, and means for supplying alternating current to said pilot circuit at a frequency dependent upon the magnitude of the power transmitted between said source and said system, said means including an alternating current generator, a differential gear, a constant speed motor for driving said generator through said gear, a variable speed means associated with said gear, and means for controlling the speed of said variable speed means in accordance with the power transmitted between said source and said system.

8. A system for indicating the amount of power transmitted between a power system and a source, comprising an indicating device, a pilot circuit for interconnecting said source and said indicating device, and means for supplying alternating current to said pilot circuit at a frequency dependent upon the magnitude of the power transmitted between said source and said system, said means including an alternating current generator, a differential gear, a constant speed motor for driving said generator through said gear, a variable speed means associated with said gear, and a wattmeter for controlling the speed of said variable speed means in accordance with the power transmitted between said source and said system.

9. A system for limiting the power transmitted between a power system and a plurality of substations interconnected by a pilot circuit adapted to transmit alternating current power therebetween in either direction, comprising means responsive to power transmitted in one direction through said pilot circuit for reducing the frequency at which power is transmitted therethrough by an amount proportional to the magnitude of the power transmitted between said substations and said system, and means responsive to power transmitted in the other direction through said pilot circuit for limiting the power transmitted between said substations and said system.

10. A system for limiting the power transmitted between a power system and a plurality of substations interconnected by a pilot circuit adapted to transmit alternating current power therebetween in either direction, comprising means responsive to power transmitted in one direction through said pilot circuit for reducing the frequency at which power is transmitted therethrough by an amount proportional to the magnitude of the power transmitted between said substations and said power system, means responsive to power transmitted in the other direction through said pilot circuit for limiting the power transmitted between said substations, and said power system, and means associated with said pilot circuit at a point intermediate its ends for supplementing the power transmitted therethrough.

11. A system for limiting the power transmitted between a power system and a plurality of substations interconnected by a pilot circuit adapted to transmit alternating current power therebetween in either direction, comprising means responsive to power transmitted in one direction through said pilot circuit for limiting the power transmitted between said substations and said system, and means responsive to power transmitted in the other direction through said pilot circuit for changing the frequency at which power is transmitted therethrough, said frequency changing means including an alternating current generator, a differential gear, means for driving said generator through said gear, a variable speed means associated with said gear, means for controlling the speed of said variable speed means in accordance with the power transmitted between said substations and said system, and means for supplementing the torque exerted on said generator by said driving means.

12. A system for limiting the power transmitted between a power system and a plurality of substations interconnected by a pilot circuit adapted to transmit alternating current power therebetween in either direction, comprising means responsive to power transmitted in one direction through said pilot circuit for limiting the power transmitted between said substations and said power system, and means responsive to power transmitted in the other direction through said pilot circuit for changing the frequency at which power is transmitted through said pilot circuit, said frequency changing means including an alternating current generator, a differential gear, means for driving said generator through said gear, a variable speed means associated with said gear, means for controlling the speed of said variable speed means in accordance with the power transmitted between said substations and said system, and means comprising a motor mounted on the shaft of said generator and a differential gear interconnecting said generator with said driving means for controlling the torque exerted by said motor to supplement the torque exerted on said generator by said driving means.

13. A system for limiting the power transmitted between a power system and a plurality of substations interconnected by a pilot circuit adapted to transmit alternating current power therebetween in either direction, comprising means for changing the frequency at which power is transmitted through said pilot circuit, said frequency changing means including a pair of mechanically coupled alternating current machines, each adapted to function as a generator when the other is supplied with power to drive it as a motor, a differential gear interposed between said machines for varying their relative speeds, driving means associated with each of said machines for supplementing the torque exerted on it by the other machine driving it as a generator, a second differential interposed between said machines, and means controlled by said second differential for selectively energizing said driving means in accordance with the direction in which power is transmitted through said pilot circuit.

14. A system for limiting the power transmitted between a power system and a plurality of substations interconnected by a pilot circuit adapted to transmit alternating current power therebetween in either direction, comprising means for supplying alternating current to said pilot circuit, means for changing the frequency at which power is transmitted through said pilot circuit by an amount proportional to the magnitude of the power transmitted between said substations and said system, and means for reversing the direction of power transmission through said pilot circuit when the load on said system reaches a predetermined value, said reversing means comprising an alternating current machine adapted to be operated as a motor at a speed dependent upon the frequency at which power is delivered from said pilot circuit, a motor driven at a speed proportional to the frequency at which power is supplied to said pilot circuit, and means responsive to a predetermined difference between the speeds of said machine and said motor for operating said machine as a generator to supply current to said pilot circuit in the reverse direction.

15. A system for limiting the power transmitted between a source and a power system, comprising a pilot circuit, means for supplying alternating current to said pilot circuit, means for changing the frequency at which power is transmitted through said pilot circuit by an amount proportional to the magnitude of the power transmitted between said source and said power system, and means for reversing the direction of power transmission through said pilot circuit when the load on said system reaches a predetermined value, said reversing means comprising an alternating current machine adapted to be operated as a motor at a speed dependent upon the frequency at which power is delivered from said pilot circuit, a motor driven at a speed proportional to the frequency at which power is supplied to said pilot circuit, and means responsive to a predetermined difference between the speeds of said machine and said motor for operating said machine as a generator to supply current to said pilot circuit in the reverse direction.

In witness whereof, I have hereunto set my hand this 23rd day of April, 1924.

WILLIAM S. H. HAMILTON.